United States Patent Office 2,727,012
Patented Dec. 13, 1955

2,727,012

LATEX COATING COMPOSITIONS CONTAINING ZINC PHOSPHATE-MODIFIED ZINC OXIDE

Lyle G. Treat and Laurence L. Ryden, Midland, Mich., assignors to The Dow Chemical Company, Midland, Mich., a corporation of Delaware No Drawing. Application February 9, 1953, Serial No. 336,019

11 Claims. (Cl. 260—23.7)

This invention relates to dispersions of zinc oxide pigments in aqueous latexes of film-forming polymers, including copolymers of aliphatic conjugated diolefins and monovinyl aromatic hydrocarbons. It relates especially to an improved stable latex paint, and a method of making the same, which paint contains zinc oxide and is adapted for outdoor use.

There has been wide-spread acceptance and use of water-emulsion coating compositions, particularly those made from aqueous dispersions of rubbery polymers, e. g. latexes of copolymers of butadiene and styrene, for making coated paper, floor coverings, "oil cloth" and other coated fabrics, and especially for making latex paints for protective and decorative purposes. Latex paints have inherent advantages over oil paints, such as freedom from toxic, flammable solvents, ease of application, speed of drying, ease of cleaning and resistance of alkali.

However, the use of such latex paints has been generally limited to interior applications, because the paint compositions which have been available have not had satisfactory resistance to weathering in exterior exposures.

To a considerable extent, resistance to exterior weathering is related to the kind of pigment, and the proportion thereof to the binder, in the dry paint film. The pigments which have been employed in conventional latex paints have not had satisfactory weathering durability, and pigments which were believed to have satisfactory weathering durability have not been sufficiently compatible with conventional latex compositions to permit the preparation of a satisfactory exterior paint.

It has been proposed to make latex paints suitable for exterior use by employing a pigment system containing zinc oxide. It has been shown that the dried films of latex paints containing butadiene-styrene copolymer latexes and zinc oxide in combination with other pigments have satisfactory durability for exterior exposure. Zinc oxide is one of the best pigments known because of its combination of desirable properties, e. g. whiteness, capacity, resistance to sulfide darkening, resistance to mildew and resistance to staining. However, latex paints which have been compounded with zinc oxide pigments have hithertofore been unsatisfactory because of the poor stability of the paint mixture; such a paint, on standing, tends to thicken, i. e. the viscosity increases. The aqueous latex dispersion comprising zinc oxide sometimes gels, a portion may settle as a hard layer to the bottom of the container, or a portion may separate as a coarse dispersion of hard granules. A complete coagulation of the dispersion sometimes occurs, in which case the mixture separates irreversibly into two phases. Such changes in the properties of the latex-pigment composition cause difficulties when the composition is to be applied and often render the composition useless.

Zinc oxide pigments are known as "reactive" pigments, i. e. the zinc oxide tends to react chemically with other components of the coating composition. It has been proposed to render zinc oxide pigments less reactive by coating the zinc oxide particles with a relatively thin, impermeable layer of a more inert material, e. g. zinc phosphate. Water-emulsion coating compositions made from a latex of a film-forming polymer, e. g. a butadiene-styrene copolymer latex, and a phosphated zinc oxide pigment have somewhat better stability than those made from ordinary zinc oxide, but are not sufficiently stable for commercial use involving prolonged storage.

There is a need for stable latex coating compositions comprising zinc oxide pigment, and particularly for stable latex paints, comprising zinc oxide, that are suitable for outdoor use.

An object of this invention is to provide improved water emulsion coating compositions comprising zinc oxide pigment and an aqueous latex of a film-forming polymer. A more particular object is to provide a stable latex coating composition comprising a phosphated zinc oxide pigment and an aqueous latex of a film-forming polymer, such as a copolymer of an aliphatic conjugated diolefin and a monovinyl aromatic hydrocarbon. Another object is to provide such a stable latex coating composition in the form of a latex paint which is resistant to weathering out-of-doors and is suitable for exterior application. Other objects will be evident from the following description of the invention.

These objects are attained by the improved water-emulsion coating compositions of this invention, in which an aqueous latex of a film-forming polymer is compounded with a pigment composition containing phosphated zinc oxide and a beta-oxyalkylamine salt of oleic acid.

More specifically, we have found that compositions comprising an aqueous latex of a film-forming polymer, e. g. a copolymer of an aliphatic conjugated diolefin and a mono-vinyl aromatic hydrocarbon, such as a butadiene-styrene copolymer, in admixture with a pigment composition containing 10 to 50 per cent by weight of a phosphated zinc oxide pigment, are stabilized by the presence of at least 2, preferably from 2.6 to 6.6, parts by weight per 100 parts of pigment, of a beta-oxyalkylamine salt of oleic acid.

By a "beta-oxyalkylamine salt of oleic acid" we mean an addition compound, salt, or soap of oleic acid with an aliphatic amine containing the atomic grouping

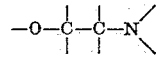

which grouping can be called a beta-oxyalkylamino group. Amines which contain the beta-oxyalkylamino group, and whose oleic acid salts are stabilizers for the compositions of this invention, are amines having the structure:

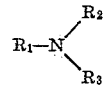

wherein $R_1$ is

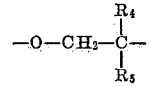

and wherein $R_2$ is $R_1$ or hydrogen; $R_3$ is $R_2$ or the radical —$CH_2$—$CH_2$—; and $R_4$ and $R_5$ are hydrogen or a lower alkyl radical preferably containing not more than two carbon atoms; the radical $R_1$ being connected to the nitrogen atom of the amine through the valence on the carbon atom of the radical $R_1$, the free valence on the oxygen atom of the radical $R_1$ being satisfied by a member of the group consisting of hydrogen and the radical —$CH_2$—$CH_2$— when $R_3$ is said radical, the free valence on the radical —$CH_2$—$CH_2$— being thereby satisfied.

Typical beta-oxyalkylamines having the above-described structure are:

Ethanolamine:

Isopropanolamine:

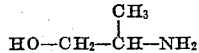

2-amino-2-methyl-propanol:

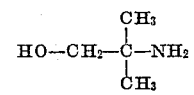

2-amino-1-butanol:

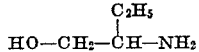

Diethanolamine:

(HO—CH₂—CH₂)₂NH

Triethanolamine:

(HO—CH₂—CH₂)₃N

Tri-isopropanolamine:

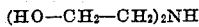

Morpholine:

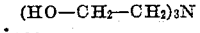

N-(2-hydroxyethyl)-morpholine:

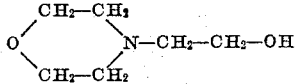

These beta-oxyalkylamines, which may be primary, secondary, or tertiary amines, are basic, hydrophilic substances which react with oleic acid, e. g. in water or preferably alcohol, to form saponaceous compositions. The water-soluble, surface-active reaction product is an addition compound, or salt, of oleic acid and the amine, as distinguished from an ester, amide or other derivative.

The oleic acid which is employed may be pure oleic acid or may be any of the commercial grades of oleic acid such as the so-called "red oil," which is a mixture of fatty acids, predominately oleic acid.

The oleic acid and the amine are preferably reacted in chemically equivalent, or nearly equivalent, proportions. In practice, the oleic acid is usually dissolved in alcohol, e. g. 95 per cent ethanol, and the beta-oxyalkylamine is added with stirring until the mixture is neutral or, preferably, slightly alkaline. The amount of alcohol is chosen to give the desired concentration of oleic acid-amine salt in the solution, usually about 50 per cent by weight, for convenience in handling. Other water-soluble solvents may be used, or the solvent may be omitted.

The beta-oxyalkylamine oleates which are effective stabilizers for these phosphated zinc oxide pigment dispersions are known to be surface active agents. They are very water-soluble and are hydrophilic wetting agents. It is, therefore, surprising that the coating compositions of this invention, which contain relatively large proportions of such hydrophilic surface-active materials, should have, as dried coatings, any appreciable resistance to water. It might be expected that coatings deposited from the compositions of this invention might be readily redispersed in water, or at least be softened and damaged thereby. On the contrary, such coatings are unexpectedly water-resistant, can be wet-scrubbed without damage, and are resistant to weathering in outdoor exposures.

Since it is widely believed that coating compositions containing zinc oxide pigments are unstable because of the chemical reactivity of the zinc oxide, it is also surprising that stable compositions are obtained by the addition, to a film-forming latex, of zinc oxide and a substance, i. e. a beta-oxyalkylamine oleate, which might be expected to be chemically reactive with the zinc oxide.

The improved coating compositions of this invention are dispersions of pigments in aqueous latexes of film-forming polymers which, upon drying as a thin layer, serve to bind the pigment particles to each other and to the supporting surface. Conventional latex paints of this kind are described by L. L. Ryden in U. S. Patent No. 2,498,712; paper-coating compositions have been described by A. E. Young and E. K. Stilbert in U. S. Patent No. 2,537,114.

Film-forming latexes suitable for making conventional coating compositions are suitable for making our improved compositions. Especially suitable latexes are those of polymers and copolymers of polymerizable unsaturated organic compounds, particularly the copolymers of an aliphatic conjugated diolefin and a monovinyl aromatic hydrocarbon, and the plasticized homopolymers of a monovinyl aromatic hydrocarbon of the benzene series, such as plasticized polystyrene or plasticized polymeric vinyltoluene. The preferred latexes are those of copolymers of 40 to 60 mole per cent of an aliphatic conjugated diolefin of the class of 1,3-butadiene (herein referred to as "butadiene"), and isoprene and at least 15 mole per cent of a monovinyl aromatic hydrocarbon of the benzene series, i. e. monovinyl derivatives of benzene and homologues of benzene wherein the single vinyl group is attached directly to a carbon atom of the benzene nucleus, which benzene nucleus may be additionally substituted by one or more lower alkyl radicals. Examples of suitable copolymers are those of styrene and butadiene; styrene and isoprene; vinyltoluene (i. e., nuclear methylstyrene) and butadiene; vinyltoluene and isoprene; vinylxylene (nuclear dimethylstyrene) and butadiene or isoprene; butadiene or isoprene and ethylstyrene or isopropylstyrene; styrene, butadiene and vinyl chloride; styrene, butadiene and vinylidene chloride; etc. The copolymer may also contain minor amounts of other polymerizable unsaturated organic compounds.

Methods of preparing aqueous latex dispersions of such polymers are well known. Usually, the polymerizable monomeric compounds, in proportions corresponding to the desired composition of the polymer to be prepared, are emulsified with an aqueous medium and polymerized therein. The proportions of polymerizable compounds and of aqueous medium are selected to produce a latex having the desired proportion, usually from 25 or less to 65 or more, preferably from about 40 to about 55, per cent by weight of the dispersed polymer therein.

A variety of suitable emulsifiers are known to the art and include the saponaceous anionic surface-active agents such as the alkali salts of soap-forming fatty acids, alkali salts of sulfated higher alcohols, alkali salts of sulfonated alkylated aromatic hydrocarbons, etc., and the non-ionic surface-active agents such as the alkylated aryl polyether alcohols. The emulsifier is usually used in an amount corresponding to from 0.5 or less to 5 or more per cent by weight of the polymerizable monomeric compounds. If desired, a polymerization catalyst may be used, such as one of the peroxygen compounds, e. g. hydrogen peroxide, potassium persulfate, or benzoyl peroxide, in minor amounts as is known to the art. Polymerization of the polymerizable monomers is effected by heating the emulsion, usually at temperatures between about 50° and 100° C., for such a time as to produce the desired polymer product. After the polymerization is completed, the polymer latex may be further treated if desired. For example, unreacted monomeric and other volatile substances may be removed, and the pH may be modified by the addition of acidic or basic substances. For the purposes of this invention, it is necessary that the latex be alkaline, i. e. have a pH greater than 7, preferably 9 to 10. Other formulating agents may be added, e. g. additional emulsifiers, protective colloids, freeze stabilizers, antioxidants, viscosity modifiers, etc. to give the latex the desired properties. These procedures are all well known in the art. Any such latex previously known to be suitable for making pigmented coating compositions is suitable for making the improved pigmented coating compositions of this invention by mixing with a pigment containing a phosphated zinc oxide and adding a beta-oxyalkylamine oleate stabilizer.

The pigments particularly suitable for making the improved coating compositions of this invention are those containing from 10 to 50 parts of a phosphated zinc oxide pigment per 100 parts, by weight, of the total pigment, although larger or smaller proportions may be used if desired. Suitable phosphated zinc oxide pigments are prepared by treating zinc oxide particles under such conditions that there is formed, by molecular reaction, a substantially uniform, thin, impervious coating of zinc phosphate on the surface of the particles, whereby the particles are rendered substantially unreactive, i. e. are rendered chemically less reactive with substances which are ordinarily reactive with zinc oxide, e. g. linseed oil fatty acids. Phosphated zinc oxide pigments are described in U. S. Patents Nos. 2,251,869, 2,251,870, 2,251,871 and 2,251,872. The balance of the pigment mixture may include any finely divided, inert pigment, pigment extender, filler or the like which is commonly used in pigmented latex compositions, such as lithopone, titanium oxide, zinc sulfide, iron oxides, mica, china clay, mineral silicates, etc. The pigment substances should not contain any appreciable amount of soluble compounds of polyvalent metal cations since these latter compounds tend to coagulate the latex dispersion. The pigment is usually prepared as an aqueous paste by mixing with water before adding the latex composition. The pigment paste may contain a minor amount, e. g. about 0.5 per cent of the weight of the pigment, of a pigment dispersing or deflocculating agent such as tetrasodium pyrophosphate or potassium tripolyphosphate, and/or up to about 3 per cent of the weight of the pigment of a water-dispersible protective colloid such as a partially hydrolyzed polymer of vinyl acetate, a water-soluble cellulosic ether (methyl cellulose), proteinaceous materials (casein), alignates, etc. but these are not required and may be omitted.

In order that these pigmented latex coating compositions be stable during prolonged storage, it is necessary that there be added, per 100 parts of pigment, at least 2, preferably from 2.6 to 6.6, parts by weight of at least one beta-oxyalkylamine salt of oleic acid as a stabilizing agent. In general, the preferred amount of stabilizing agent, within the range stated, is greater with pigment compositions having larger proportions of phosphated zinc oxide. Also, in general, the degree of effectiveness of the stabilizing agent and the degree of stability of the pigmented composition are proportionate to the amount of stabilizing agent used, within the proportions stated. When less than about 2 parts of a beta-oxyalkylamine salt of oleic acid is used per 100 parts of pigment, the compositions are not satisfactorily stable for prolonged storage, although the stability may be better than when such a stabilizer is entirely omitted. More than 6.6 parts of the stabilizer may be used per 100 parts of pigment, but such compositions are not noticeably more stable than the preferred compositions and may be undesirably foamy during application as coatings.

Depending on the intended application, the improved coating compositions may contain a wide range of relative proportions of pigment, polymer solids and aqueous medium.

The improved coating compositions usually contain from 30 to 70, preferably from 40 to 65, per cent by weight total solids which solids contain from 15 to 100 parts of polymer per 100 parts, by weight, of pigment, although more or less than these proportions may be employed.

The foregoing method permits production of latex coating compositions comprising a zinc oxide pigment and an aqueous latex of a film-forming polymer, which compositions are stable, i. e. do not thicken, gel, separate or coagulate on standing for several months or longer at room temperature in a closed container. More specifically, it permits production of latex paints comprising a phosphated zinc oxide pigment and an aqueous latex of a film-forming polymer, which paints remain smoothly dispersed during prolonged storage, and from which are obtained surface coatings that are durable to exterior weathering. These improved latex paints are especially well adapted to use on masonry surfaces.

The following examples, which show ways in which the invention has been practiced, are not to be construed as limiting the invention. In the examples, parts and percentages are by weight, unless otherwise specified.

EXAMPLE 1

This example illustrates the making of a stable latex paint, suitable for exterior application, by admixing together a styrene-butadiene latex and a pigment paste containing phosphated zinc oxide and a beta-oxyalkylamine oleate.

A styrene-butadiene copolymer latex was prepared according to Example 1 of Ryden's U. S. Patent No. 2,498,712. To this latex was added a mono(di-sec-butylphenyl) ether of polyethylene glycol, having about ten ethoxy units and an average molecular weight of about 650, in an amount corresponding to 2.5 parts per 100 parts of copolymer in the latex. This modified latex was used in making the paint.

A pigment paste was prepared by thorough mixing of the following composition:

| | Parts |
|---|---|
| Phosphated zinc oxide pigment | 40 |
| Titanium dioxide | 40 |
| Mica | 20 |
| Total pigments | 100 |
| Methyl cellulose, 100 centipoise, 4% aqueous solution | 35.0 |
| Sodium pentachlorophenate, 10% aqueous solution | 4.0 |
| Monoethanolamine oleate 50% alcoholic solution | 10.0 |
| Tributyl phosphate | 1.0 |
| Pine oil | 0.36 |
| Water | 49.64 |
| Total pigment paste | 200 |

In the pigment paste, the titanium dioxide and mica were of kinds conventionally employed in making latex paints. The methyl cellulose was added as a protective colloid and viscosity control agent, the sodium pentachlorophenate as a preservative, the tributylphosphate as plasticizer and antifoamer, and the pine oil as deodorant and antifoamer, all in accordance with conventional practice.

The monoethanolamine oleate was used as the stabilizer, in accordance with this invention, in amount corresponding to five parts of the stabilizer per 100 parts of the pigment.

Two hundred parts of the pigment paste were mixed with 70 parts of the above-described modified styrene-butadiene copolymer latex, to make a white latex paint having approximately 51.5 per cent total solids wherein there were approximately 32 parts of copolymer per 100 parts of pigment. After several months' storage in a closed container, the paint was still smoothly dispersed. The paint was suitable for exterior application, and, when dried as a thin layer on a supporting surface, formed a protective film which was durable to weathering.

The essential ingredients of the above-described improved, stable latex paint are the pigment, the latex and the stabilizer, namely the monoethanolamine oleate. The other ingredients, although performing desirable functions, are not essential to the purposes of this invention, and other such ingredients could have been used instead of, or in addition to, those listed, or one or more of such unessential ingredients could have been omitted from the composition. The omission of such unessential ingredients is illustrated in Example 2.

EXAMPLE 2

Two latex paints were made by procedure similar to that described in Example 1, except for slight modifications in the pigment paste compositions used in compounding the paints. In the making of the one latex paint, the pine oil was omitted from the pigment paste, and in the other the pine oil and the tributyl phosphate were omitted from the pigment paste, the other ingredients in each case being essentially the same as in Example 1.

Both paints were stable, remaining smoothly dispersed during several months in closed containers, and were suitable for exterior application.

EXAMPLE 3

This example shows the effect of variations in the concentration of the beta-oxyalkylamine oleate stabilizer on the stability of the paint.

A series of latex paints was prepared using a phosphated zinc oxide pigment and a latex of styrene and butadiene copolymer in which the copolymer was about 48 per cent of the total latex and was approximately 44 mole per cent styrene and 56 mole per cent butadiene. All of the paints contained the same kinds and proportions of ingredients, except for the amount of monoethanolamine oleate present therein.

The paints, identified as A through F in Table I, were compounded according to the following formula, by procedure similar to that of Example 1.

|  | Parts |
| --- | --- |
| Phosphated zinc oxide pigment | 40.0 |
| Titanium dioxide | 40.0 |
| Mica | 20.0 |
| Total pigments | 100 |
| Methyl cellulose, 100 centipoise, 4% aqueous solution | 35.0 |
| Sodium pentachlorophenate 10% aqueous solution | 4.0 |
| Monoethanolamine oleate (as 50% alcoholic solution) | (¹) |
| Tributyl phosphate | 1.0 |
| Pine oil | 0.3 |
| Latex | 71.2 |
| Water | 37.8 |

¹ As cited, Table I.

All of the paints so prepared had a pigment-volume concentration of about 40 per cent, and a pigment-binder ratio of about 100 to 34. They were stored in closed containers and examined from time to time.

In Table I is shown the amount of monoethanolamine oleate added to each of the paints A through F, prepared as described above; the monoethanolamine oleate was added in the form of a 50 per cent solution in 95 per per cent ethanol for convenience in handling, the amount of solution used in each case being twice that shown in the table as monoethanolamine oleate.

*Table I*

| Paint | Monoethanolamine Oleate, Parts per 100 Parts of Pigment | Storage Stability |
| --- | --- | --- |
| A | 0.60 | Coagulated in about 1 month. |
| B | 1.28 | Coagulated in about 4 months. |
| C | 1.96 | Very slight thickening in about 4 months. |
| D | 2.6 | OK up to 4 months, very slight thickening after 14 months. |
| E | 4.6 | OK after 14 months. |
| F | 6.6 | Do. |

The data in Table I show that at least 2 parts of monoethanolamine oleate per 100 parts of pigment are necessary to stabilize the paint during storage. Paints D, E and F were all suitable for use and for exterior application, even after 14 months storage in closed containers.

EXAMPLE 4

A latex paint was made having the following composition:

|  | Parts |
| --- | --- |
| Phosphated zinc oxide pigment | 40.0 |
| Titanium dioxide | 40.0 |
| Mica | 20.0 |
| Total pigment | 100 |
| Methyl cellulose, 100 centipoise, 4% aqueous solution | 35.0 |
| Sodium pentachlorophenate 10% aqueous solution | 4.0 |
| Tetrasodium pyrophosphate 5% aqueous solution | 10.0 |
| Tributyl phosphate | 1.0 |
| Pine oil | 0.3 |
| Monoethanolamine oleate 50% alcoholic solution ¹ | 13.2 |
| Latex ² | 78.1 |
| Water | 36.5 |
| Total paint | 278.1 |

¹ Equivalent to 6.6 parts monoethanolamine oleate.
² A commercial styrene-butadiene latex, conventionally used for latex paints, containing about 45 per cent by weight of a copolymer of about 60 weight per cent styrene and 40 weight per cent butadiene.

A portion of the paint was closed in a container, stored at room temperature, and examined from time to time. After fourteen months, the paint was still smoothly dispersed, easily brushed out and suitable for use in coating applications.

Portions of the paint were spread on an oil-paint-primed metal test panel and on a test panel of asbestos-cement board. After drying, the latex-paint-coated test panels were exposed to weathering in a rural location, the test panels being set at an angle of 45°, facing south, in a conventional manner. After one year of such exposure, the test panels were examined. The paint films on both panels were in good condition, showing good adhesion and no cracking or spalling. The dirt retention on the latex paint panels was less than that on a conventional exterior oil paint panel exposed at the same time. The latex paint panels were readily cleaned by light washing with mild soap and water. The loss in weight of the latex paint coated primed metal test panel during the one year's exposure was found to be 12.8 per cent of the weight of the original dried coating.

Other latex paints were prepared similar to the one described above except that the latex employed therein was replaced by one of the following latexes in amount such as to provide the same quantity of binder, all of the latexes containing about 45 to 50 per cent non-volatile solids:

(a) A latex of a copolymer of 66 per cent styrene and 34 per cent butadiene.
(b) A latex containing a mixture of copolymers, averaging 70 per cent styrene and 30 per cent butadiene.
(c) A latex of a copolymer of 80 per cent styrene and 20 per cent butadiene.
(d) A latex of a copolymer of 55 per cent styrene and 45 per cent butadiene.
(e) A latex of polystyrene plasticized with a low molecular weight poly-alpha-methylstyrene plasticizer, the amount of plasticizer being equal to the amount of the polymer.

All of these paints were stable during storage at room temperature for more than 14 months. Test panels of oil-paint-primed metal and of asbestos cement board were coated with each of the paints and exposed to the weather as previously described in this example. After one year of such exposure, all of the paints were in good condition, except that paint (e) showed somewhat greater dirt retention than did any of the others.

EXAMPLE 5

This example shows the use of oleic acid salts of several different beta-oxyalkylamines as stabilizers for zinc oxide pigmented latex paints. A series of paints, identified as G through I, was made from a composition similar to that of Example 3, except that, instead of monoethanolamine oleate, there was used 6 parts of the beta-oxyalkylamine oleates named in Table II, added as 50 per cent solutions in 95 per cent ethanol.

Table II

| Paint | Beta-oxyalkylamine oleate, 6 parts per 100 parts of pigment | Storage Stability after 1 year |
|---|---|---|
| G | morpholine oleate | OK |
| H | triethanolamine oleate | OK |
| I | 2-amino-2-methylpropanol oleate | OK |

In the preparation of exterior latex paints, pigments other than those shown in the examples may be employed, and the proportions may be varied, provided that the pigment composition, i. e., the mixture of pigments, contains from 10 to 50 per cent, by weight, of a phosphated zinc oxide pigment. A preferred exterior pigment composition consists of 10 to 50 per cent phosphated zinc oxide pigment, 20 to 60 per cent titanium dioxide pigment (preferably the non-chalking rutile type, especially prepared for use in aqueous compositions), and 20 to 40 per cent mica (preferably the water-ground type).

The beta-oxyalkylamine oleates may be used in accordance with this invention to prepare stable latex coating compositions containing phosphated zinc oxide pigment for any conventional application, e. g. to paper, cloth and other supports, by brushing, rolling, spraying, dipping, etc.

We claim:

1. A latex coating composition comprising an intimate mixture of a pigment, including a zinc oxide coated with zinc phosphate, and an alkaline aqueous film-forming polymer dispersion, which polymer is selected from the group consisting of copolymers of an aliphatic conjugated diolefin and a monovinyl aromatic hydrocarbon and plasticized homopolymers of monovinyl aromatic hydrocarbons, and an oleic acid salt of a beta-oxyalkylamine selected from the class consisting of beta-hydroxyalkyl amines and morpholinyl compounds in an amount corresponding to at least two parts by weight per 100 parts of pigment.

2. A latex coating composition comprising an intimate mixture of a pigment, which pigment contains from 10 to 50 per cent by weight of a zinc oxide coated with zinc phosphate, and an alkaline aqueous film-forming polymer dispersion, which polymer is selected from the group consisting of copolymers of an aliphatic conjugated diolefin and a monovinyl aromatic hydrocarbon and plasticized homopolymers of monovinyl aromatic hydrocarbons, and an oleic acid salt of a beta-oxyalkylamine selected from the class consisting of beta-hydroxyalkyl amines and morpholinyl compounds in an amount corresponding to approximately 2.6 to 6.6 parts by weight per 100 parts of pigment.

3. A latex coating composition as claimed in claim 2, wherein the beta-oxyalkylamine salt of oleic acid is monoethanolamine oleate.

4. A latex coating composition as claimed in claim 2, wherein the beta-oxyalkylamine salt of oleic acid is triethanolamine oleate.

5. A latex coating composition as claimed in claim 2, wherein the beta-oxyalkylamine salt of oleic acid is the oleic acid salt of 2-amino-2-methylpropanol.

6. A latex coating composition as claimed in claim 2, wherein the beta-oxyalkylamine salt of oleic acid is morpholine oleate.

7. A latex paint comprising a pigment, which pigment contains from 10 to 50 per cent by weight of a zinc oxide coated with zinc phosphate, intimately mixed with an alkaline aqueous latex of a copolymer of at least 15 mole per cent of a monovinyl aromatic hydrocarbon of the benzene series and 40 to 60 mole per cent of an aliphatic conjugated diolefin of the group consisting of butadiene and isoprene, and an oleic acid salt of a beta-oxyalkylamine selected from the class consisting of beta-hydroxyalkyl amines and morpholinyl compounds in an amount corresponding to from 2.6 to 6.6 parts by weight per 100 parts of pigment.

8. A latex paint as claimed in claim 7, wherein the copolymer is a copolymer of 60 to 40 mole per cent of a monovinyl aromatic hydrocarbon of the benzene series and 40 to 60 mole per cent of an aliphatic conjugated diolefin of the group consisting of butadiene and isoprene.

9. A latex paint as claimed in claim 7, wherein the copolymer is a copolymer of 60 to 40 mole per cent styrene and 40 to 60 mole per cent butadiene.

10. A latex paint comprising in intimate admixture (a) a pigment, which pigment consists of 10 to 50 per cent by weight of a zinc oxide coated with zinc phosphate, 20 to 60 per cent by weight titanium dioxide, and 20 to 40 per cent by weight mica, (b) an alkaline aqueous latex of a copolymer of 60 to 40 mole per cent styrene and 40 to 60 mole per cent butadiene, the weight of the copolymer being from 15 to 100 parts per 100 parts of the pigment, and (c) from 2.6 to 6.6 parts, by weight, of monoethanolamine oleate per 100 parts of the pigment.

11. A method of stabilizing a latex coating composition during prolonged storage in a closed container, which latex coating composition comprises a pigment containing a zinc oxide coated with zinc phosphate intimately mixed with an alkaline aqueous film-forming polymer dispersion, which polymer is selected from the group consisting of copolymers of an aliphatic conjugated diolefin and a monovinyl aromatic hydrocarbon and plasticized homopolymers of monovinyl aromatic hydrocarbons, which method comprises adding to the latex coating composition at least two parts, by weight, of an oleic acid salt of a beta-oxyalkylamine selected from the class consisting of beta-hydroxylalkyl amines and morpholinyl compounds per 100 parts of the pigment.

References Cited in the file of this patent

UNITED STATES PATENTS

| 2,492,124 | Young et al. | Dec. 20, 1949 |
| 2,564,882 | Cubberley et al. | Aug. 21, 1951 |